(12) United States Patent
Jarboe et al.

(10) Patent No.: US 11,821,794 B2
(45) Date of Patent: Nov. 21, 2023

(54) DEVICE AND METHOD FOR PROCESS CONTROL FOR SURFACES WITH A LOW, UNKNOWN, AND/OR VARIABLE EMISSIVITY

(71) Applicant: Exergen Corporation, Watertown, MA (US)

(72) Inventors: Jason N. Jarboe, Somerville, MA (US); Francesco Pompei, Cambridge, MA (US)

(73) Assignee: EXERGEN CORPORATION, Watertown, MA (US)

( * ) Notice: Subject to any disclaimer, the term of this patent is extended or adjusted under 35 U.S.C. 154(b) by 123 days.

(21) Appl. No.: 17/176,705

(22) Filed: Feb. 16, 2021

(65) Prior Publication Data

US 2021/0181026 A1 Jun. 17, 2021

Related U.S. Application Data

(62) Division of application No. 15/969,959, filed on May 3, 2018, now Pat. No. 10,955,295, which is a division
(Continued)

(51) Int. Cl.
*G01J 5/06* (2022.01)
*G01J 5/00* (2022.01)
(Continued)

(52) U.S. Cl.
CPC ............ *G01J 5/06* (2013.01); *G01J 5/0003* (2013.01); *G01J 5/0022* (2013.01); *G01J 5/061* (2013.01);
(Continued)

(58) Field of Classification Search
None
See application file for complete search history.

(56) References Cited

U.S. PATENT DOCUMENTS 2,424,976 A 8/1947 Golay et al.
3,525,260 A 8/1970 Kung
(Continued)

FOREIGN PATENT DOCUMENTS

EP 0 623 811 A1 11/1994
EP 0 623 811 B1 1/1998
EP 2 187 189 A1 5/2010

OTHER PUBLICATIONS

Advisory Action for U.S. Appl. No. 14/202,998, dated Dec. 21, 2017.
(Continued)

*Primary Examiner* — Erica S Lin
(74) *Attorney, Agent, or Firm* — Hamilton, Brook, Smith & Reynolds, P.C.

(57) ABSTRACT

Devices and corresponding methods can be provided to monitor or measure temperature of a target or to control a process. Targets can have low, unknown, or variable emissivity. Devices and corresponding methods can be used to measure temperatures of thin film, partially transparent, or opaque targets, as well as targets not filling a sensor's field of view. Temperature measurements can be made independent of emissivity of a target surface by, for example, inserting a target between a thermopile sensor and a background surface maintained at substantially the same temperature as the thermopile sensor. In embodiment devices and methods, a sensor temperature can be controlled to match a target temperature by minimizing or zeroing a net heat flux at the sensor, as derived from a sensor output signal. Alternatively, a target temperature can be controlled to minimize the heat flux.

21 Claims, 6 Drawing Sheets

Related U.S. Application Data of application No. 14/202,998, filed on Mar. 10, 2014, now Pat. No. 9,976,908.

(60) Provisional application No. 61/871,283, filed on Aug. 28, 2013, provisional application No. 61/842,204, filed on Jul. 2, 2013.

(51) Int. Cl.
    *G01J 5/061*    (2022.01)
    *G01J 5/12*    (2006.01)
    *G01J 5/16*    (2006.01)

(52) U.S. Cl.
    CPC . *G01J 5/12* (2013.01); *G01J 5/16* (2013.01); *G01J 5/064* (2022.01); *G01J 2005/0029* (2013.01)

(56) References Cited

U.S. PATENT DOCUMENTS

| | | | |
|---|---|---|---|
| 4,602,642 | A | 7/1986 | O'Hara et al. |
| 4,636,091 | A | 1/1987 | Pompei et al. |
| 4,900,162 | A | 2/1990 | Beckman et al. |
| 5,017,019 | A | 5/1991 | Pompei |
| 5,178,464 | A | 1/1993 | Fraden |
| 5,314,249 | A | 5/1994 | Marui et al. |
| 5,319,202 | A | 6/1994 | Pompei |
| 5,894,126 | A | 4/1999 | Pompei et al. |
| 6,641,301 | B2 | 11/2003 | Pompei |
| 9,534,958 | B1 | 1/2017 | Lhamon et al. |
| 9,976,908 | B2 | 5/2018 | Jarboe et al. |
| 10,955,295 | B2 | 3/2021 | Jarboe et al. |
| 2003/0067956 | A1 | 4/2003 | Hashimoto et al. |
| 2004/0267850 | A1 | 12/2004 | Bird et al. |
| 2006/0266943 | A1 | 11/2006 | Phelan |
| 2007/0262071 | A1* | 11/2007 | Matzenmuller ...... H05B 3/0057 219/405 |
| 2009/0219971 | A1 | 9/2009 | Liess et al. |
| 2011/0068261 | A1* | 3/2011 | Sturm ............... G01N 21/86 250/252.1 |
| 2012/0025081 | A1 | 2/2012 | Rapp et al. |

OTHER PUBLICATIONS

Chen, L., et al., "Design Principle for Simultaneous Emissivity and Temperature Measurements," Opt. Eng., 29(12): 1445-1448 (1990).

Dolezal, I. and Hes, L., "Emissivity Independent Low-Temperature Pyrometry," Proc. SPIE, 6939: 1-11 (2008).

Exergen Corporation SmartIRt/c http://www.exergen.com/industrial/smartirtc/index.html. (date unavailable).

Exergen Corporation SmartIRt/c Infrared Temperature Sensor. (date unavailable).

Final Office Action for U.S. Appl. No. 14/202,998, dated Aug. 4, 2017.

Interview Summary for U.S. Appl. No. 14/202,998, dated Jan. 9, 2018.

Nordine, P.C., "The Accuracy of Multicolo Optical Pyrometry," High Temperature Science, 21(2): 97-109 (1986).

Notice of Allowance for U.S. Appl. No. 14/202,998, dated Feb. 1, 2018.

Office Action for U.S. Appl. No. 14/202,998, dated Jan. 26, 2017.

PCT/US2014/045073 Notification of Transmittal of the International Search Report and the Written Opinion of the International Searching Authority, or the Declaration dated Sep. 19, 2014 entitled "Infrared Contrasting Color Temperature Measurement System."

Woskov, P.P. and Sundaram, S.K., "Thermal Return Reflection Method for Resolving Emissivity and Temperature in Radiometric Measurements," J. App. Phys., 92(10): 6302-6310 (2002).

Non-Final Office Action dated Jul. 10, 2019 in U.S. Appl. No. 15/969,959; "Method for Temperature Measurements of Surfaces With a Low, Unknown, and/or Variable Emissivity".

Non-Final Office Action dated Feb. 4, 2020 in U.S. Appl. No. 15/969,959; "Method for Temperature Measurements of Surfaces With a Low, Unknown, and/or Variable Emissivity".

Final Office Action dated Jul. 14, 2020 in U.S. Appl. No. 15/969,959; "Method for Temperature Measurements of Surfaces With a Low, Unknown and/or Variable Emissivity".

Notice of Allowance dated Nov. 25, 2020 in U.S. Appl. No. 15/969,959; "Method for Temperature Measurements of Surfaces With a Low, Unknown and/or Variable Emissivity".

* cited by examiner

DEVICE AND METHOD FOR PROCESS CONTROL FOR SURFACES WITH A LOW, UNKNOWN, AND/OR VARIABLE EMISSIVITY

RELATED APPLICATIONS

This application is a Divisional of U.S. application Ser. No. 15/969,959, filed May 3, 2018, which is a Divisional of U.S. application Ser. No. 14/202,998, filed Mar. 10, 2014, now U.S. Pat. No. 9,976,908, which claims the benefit of U.S. Provisional Application No. 61/871,283, filed on Aug. 28, 2013, and U.S. Provisional Application No. 61/842,204, filed on Jul. 2, 2013. The entire teachings of the above applications are incorporated herein by reference.

BACKGROUND OF THE INVENTION

Non-contact temperature measurement is required for many objects. Thermopile detectors are one example of detectors that can be useful to make non-contact temperature measurements. When using thermopile detectors, it is desirable to have as large a signal as possible from the target object to distinguish the signal from noise and background sources. Emissivity, which varies from material to material and from surface to surface, and which can vary with surface temperature and other surface conditions such as oxidation, affects the signal level of a thermal detector.

SUMMARY OF THE INVENTION

While non-contact temperature measurement is extremely useful, some objects are difficult, expensive, or even nearly impossible to measure using conventional infrared (IR) thermometry techniques. One example of such objects are thin films. Further, there are other objects with low, unknown, and/or variable emissivity that can be particularly difficult to measure using existing non-contact temperature measurement techniques. Moreover, existing methods of emissivity-independent IR temperature measurement tend to give inaccurate results at low temperatures.

According to embodiments of the invention, devices and methods are provided for measuring and monitoring temperatures of objects without contact, even for target objects that are partially transparent, partially reflective, do not fill the radiation sensor's field of view, or have low, unknown, or variable emissivity. Further, targets that do not fill the sensor's field of view include targets that fill a varying fraction of the field of view, and these targets can also be measured. Even at low temperatures, such as room temperature, devices and methods according to embodiments of the invention can provide accurate temperature monitoring and measurement. Target temperatures can be in a range lower than 200° C., for example, or in a range less than 100° C.

In embodiment devices and methods, net heat flux at a radiation sensor is minimized. Net heat flux can be minimized by bringing the flux as close to zero as possible. By bringing the net heat flux as close to zero as possible, the effects of emissivity, transparency, and geometry on temperature measurement or monitoring can be removed or reduced.

A device and corresponding method for monitoring the temperature of the target may include a radiation sensor that detects radiation from a closed background surface filling a field of view of the radiation sensor and from a target that can be introduced between the background surface and the sensor. The device can also include a thermal controller that minimizes a difference between the temperature of the target and a temperature shared by the radiation sensor and background surface.

The radiation sensor can be a thermopile sensor or a bolometer, for example. Where the sensor is a thermopile, the thermal controller can be further configured to minimize the temperature difference by minimizing an output signal of the radiation sensor. Alternatively, where the sensor is a different radiation sensor such as a bolometer, the temperature difference can be minimized by minimizing a net heat flux at the sensor as otherwise derived from an output signal of the radiation sensor. The device can measure targets with temperatures less than about 200° C. or less than about 100° C., for example.

At least a portion of the background surface within the field of view can have a high reflectivity in an infrared spectrum. Furthermore, a low reflectivity portion of the background surface can be adjacent to the high reflectivity portion. The device can be configured so that the radiation sensor detects at least 10 times more radiation from the background surface than from external sources.

The target can be a thin film, for example, and can be partially transparent or partially reflective. Alternatively, the target can be an opaque target. Furthermore, the target can fill less than a full field of view of the radiation sensor or can fill a variable portion of the field of view. Targets that may not completely fill a sensor field of view or that vary in geometry can include a moving thread, wire, ribbon, a jet of liquid or a sheet of perforated metal, for example, in addition to films. The target can also have an emissivity that is low, unknown, or variable.

The device can further include a temperature gauge that is configured to measure the shared temperature of the radiation sensor and the background surface. The shared temperature can be a set control temperature, and the thermal controller can be further configured to minimize a net heat flux at the radiation sensor by controlling the temperature of the target. The net heat flux can be derived from an output signal of the radiation sensor. The difference between the temperature of the target and the shared temperature can be non-static and the device can further include a temperature analyzer configured to calculate a temperature of the target based upon the shared temperature, the output signal of the radiation sensor, and an assumed or estimated emissivity of the target.

A device for process control may include a radiation sensor that is configured to be set to a control temperature. The device can also include a web target configured to be viewed by the radiation sensor as the web target passes the radiation sensor and to be thermally controlled to minimize a net heat flux at the radiation sensor. The net heat flux can be non-static, and the device further can further include a temperature analyzer configured to calculate a temperature of the web target based upon the control temperature, the output signal of the radiation sensor, and an assumed or estimated emissivity of the web target.

The radiation sensor can be a thermopile sensor. The web target can be configured to be thermally controlled by minimizing an output signal of the radiation sensor or otherwise minimizing net heat flux at the radiation sensor as derived from an output signal. The web target can be a thin-film target or an opaque target. The web target can be partially reflective. The target can also have an emissivity that is low, unknown, or variable, and the target can fill varying portions of the sensor's field of view. The device can further include a temperature gauge configured to measure the control temperature.

The radiation sensor can also be configured to detect radiation from both a background surface and from the web target, the target being introduced between the background surface and the radiation sensor. The device can have a thermal controller configured to minimize a net heat flux at the radiation sensor, and the minimizing can be done by minimizing a difference between the temperature of the web target and a shared temperature of the radiation sensor and the background surface. The control temperature can be in a range less than about 200° C., or less than about 100° C., for example.

The device can also include a background surface filling a field of view of the radiation sensor in a background behind the target, and a portion of the background surface within the field of view can have high reflectivity in an infrared spectrum. The radiation sensor can be configured to detect at least 10 times more radiation from the background surface than from external sources.

A method of measuring the temperature of the target may include viewing the target with a radiation sensor, where the target is situated between the sensor and a closed background surface filling a field of view of the radiation sensor, and where the background surface and the radiation sensor are maintained at substantially the same temperature. The method can also include adjusting a relative temperature between the radiation sensor and the target to minimize a net heat flux at the sensor, as well as determining the radiation sensor temperature. Minimizing the net heat flux can be accomplished, for example, by minimizing an output signal of the thermopile radiation sensor. Alternatively, minimum net heat flux can be otherwise derived from an output signal. Viewing the target can include viewing a partially transparent target, and the target can fill less than a full field of view of the radiation sensor. A target can have an emissivity as low as 0.1 or even as low as 0.01. Further, a target can also have an emissivity that is unknown or variable. The web target can be controlled to a temperature less than about 200° C. or to a temperature less than about 100° C.

The radiation sensor can be a thermopile sensor. The relative temperature between the radiation sensor and the web target can be adjusted by changing the temperature of the web target or by changing the temperature of the radiation sensor to minimize net heat flux. The method can also include setting the radiation sensor to a set control temperature, where the substantially same temperature is the control temperature, and adjusting the relative temperature between the sensor and the web target to minimize the net heat flux can include controlling the temperature of the target to minimize the net heat flux. The temperature in the background surface and the temperature of the radiation sensor that are substantially the same can be in a temperature range less than about 200° C. Further, the temperature can be in a range less than about 100° C.

A high reflectivity portion of the background surface within the field of view may be employed to increase thermal radiation at the radiation sensor. Further, a low reflectivity portion of the background surface adjacent to the high reflectivity portion may be employed to decrease radiation received at the radiation sensor from external sources. The radiation sensor can receive at least 10 times more radiation from the background surface than from external sources.

A method of process control may include setting a radiation sensor at a control temperature. The method can also include controlling a temperature of a web target viewed by the radiation sensor as the web target passes the radiation sensor to minimize a net heat flux at the radiation sensor.

The radiation sensor can be a thermopile sensor, and controlling the target temperature can include minimizing an output signal of the radiation sensor. The web target whose temperature is controlled can be a thin-film target, or an opaque target, and the web target can have an emissivity that is low, unknown, or variable.

The method can also include determining the control temperature, wherein the web target is situated between the sensor and a background surface and wherein the background surface and the sensor are maintained at substantially the same temperature. In this case, the target can be partially transparent or can fill less than a full field of view of the radiation sensor.

A device for monitoring a temperature of a target can include a radiation sensor configured to detect radiation from a closed background surface filling a field of view of the radiation sensor and from a target intended to be introduced between the background surface and the radiation sensor. The device can also include a thermal controller configured to minimize a difference between a temperature of the target and a shared temperature of the background surface and of a foreground surface surrounding the radiation sensor. A temperature of the radiation sensor can differ from the shared temperature of the background and foreground surfaces.

A device for process control can include a foreground surface surrounding a radiation sensor and a closed background surface filling a field of view of the radiation sensor, the foreground and background surfaces being configured to be set to a shared control temperature. The device can also include a web target configured to be viewed by the radiation sensor as the web target passes the radiation sensor and to be thermally controlled to minimize a difference between the shared control temperature and a detected temperature of the web target. A temperature of the radiation sensor can differ from the shared control temperature.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Non-contact measurement of temperature is required for many objects, and thermopile sensors are a common way to obtain such measurements. Thermopile sensors operate by outputting a voltage that is proportional to the net thermal flux carried by infrared (IR) radiation between the thermopile sensor surface and the target surface being measured. In turn, the net flux depends upon the difference between the thermopile sensor surface temperature and the target surface temperature, the emissivity of the target surface, and any radiation reflected from, or transmitted through, either the thermopile's active area or the target. When the net flux is zero at a thermopile sensor, the output signal from the thermopile sensor is also zero.

Difficulties arise in thermopile temperature measurements, however, in a number of different situations. First, the emissivity of a given target surface may not be known. Second, emissivity of the target surface may be variable. Emissivity of materials may vary, for example, when the materials change in composition during a manufacturing process. Third, if an emissivity of a target surface is low, the signal produced by the thermopile detector will be small, and the accuracy of the temperature measurement will be limited. Fourth, a target surface may not fill the field of view of the detector, and thus the detector may receive radiation from sources other than the intended target, giving rise to measurement inaccuracies.

A fifth difficulty can arise in thermopile temperature measurements when the target surface is partially transparent or partially reflective. For example, even if a partially transparent target fills the field of view of the sensor, the thermopile generally detects radiation not only from the partially transparent target, but also from background IR sources that are in the field of view of the sensor behind the target. The emissivity of background sources may not be known or may not easily be taken into account in measurements, and thus any temperature measurements of the partially transparent target surface can be inaccurate. Further, even if emissivities for all background sources were known, the temperatures of background sources, which will also affect the measurements, are generally not known.

However, in accordance with embodiments of the current invention, these difficulties may be overcome. Devices and processes can be provided for accurate, non-contact temperature measurements of target objects with low, variable, or unknown emissivities. Further, even where target objects are partially transparent or do not fill the field of view of the sensor, temperatures may still be determined. Device and process embodiments can be applied, for example, to thin-film targets.

Figure 1:
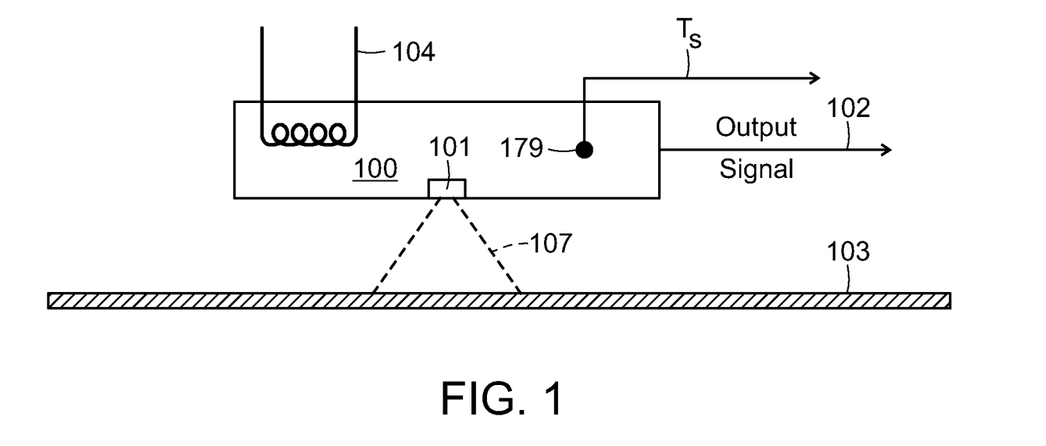
FIG. 1 is an illustration of a sensor and infrared sensor viewing an opaque web target.

FIG. 1 shows a detector device 100 for process control illustrating how temperature measurements can be obtained for an opaque target 103 even when the emissivity of the target 103 is unknown. A thermopile radiation sensor 101 having a field of view 107 is configured to view a web target 103. The sensor 101 can be set to control temperature (not shown) and has an output signal 102. The sensor 101 that is shown includes a thermal source 104 to control its temperature, which is measured by a thermistor sensor 179 that provides an output signal from which the sensor temperature $T_s$ can be determined. The thermal source 104 can be adjusted to control the sensor 101 thermally based on the output signal 102 of the sensor 101. The thermal source 104 can be a heater coil, for example, in applications where no cooling is required for thermal control. In other applications, however, both heating and cooling are required for thermal control. In those applications, the thermal source 104 can be a thermoelectric cooler, for example.

Figure 7:
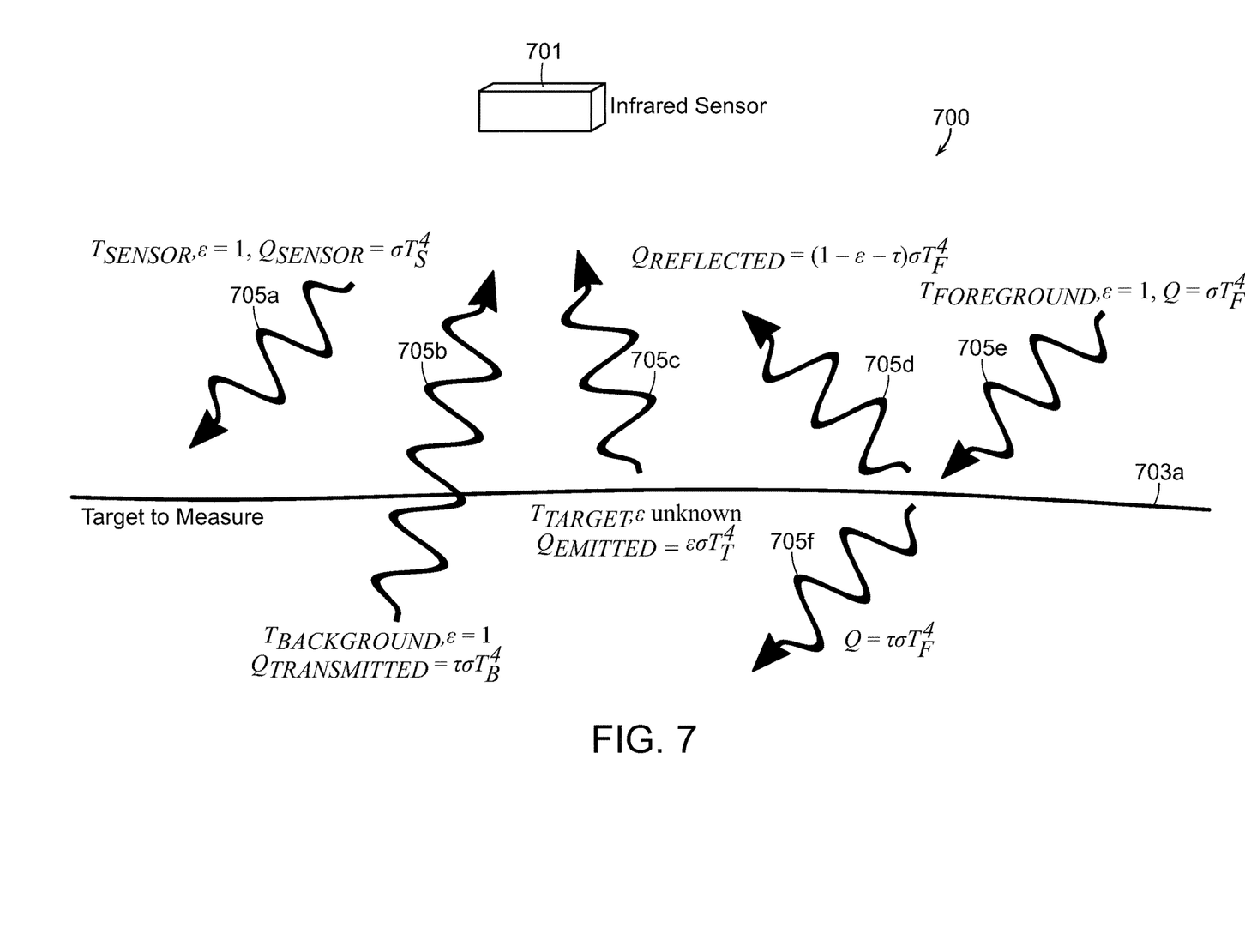
FIG. 7 is a schematic diagram illustrating sources of thermal radiation absorbed and emitted by an infrared sensor, using greybody assumptions.

In the device of FIG. 1, the output signal 102 of the sensor 101 is proportional to the net IR radiation flux incident at the sensor, because the sensor 101 is a thermopile sensor. In turn, the net IR radiation flux is proportional to the emissivity of the web target 103. However, the net flux also depends on the temperature difference $\Delta T$ between the sensor temperature $T_s$ and the target temperature $T_t$. Using "greybody" assumptions explained below in conjunction with FIG. 7, it can be shown that the net flux $Q_{NET}$ at the thermopile sensor can be approximated by $$Q_{NET} = \varepsilon \sigma (T_t^4 - T_s^4),$$

where $T_t$ is the temperature of the target, $T_s$ is the temperature of the sensor, $\varepsilon$ is the emissivity of the target, and $\sigma$ is the Stefan-Boltzman constant. From this equation, it can be seen for a thermopile sensor that if the target and thermopile sensor temperatures are the same, and only when the same, then the net flux at the thermopile sensor is zero, regardless of the emissivity value for the target 103. In fact, even for non-greybodies, the net flux is zero, regardless of the emissivity value for the target 103, if the target and sensor temperature are the same. However, in the case of greybodies, the equation for $Q_{NET}$ is more complex than the equation shown above for greybodies.

The device of FIG. 1 can thus be used to determine the temperature of the web target 103 of unknown emissivity as follows. The thermal source 104 can be adjusted until the output signal 102 of the sensor is zero. When the output is zero, the net flux is zero, indicating that the temperature $T_t$ of the target is the same as the temperature $T_s$ of the sensor 101. Thus, if the adjusted sensor temperature $T_s$ is measured using the thermistor 179, then the temperature of the target 103 is also known.

Alternatively, in a process control context, the device of FIG. 1 can be used to determine whether the opaque target 103 is at a desired temperature in the following manner. The temperature $T_s$ of the sensor 101 can be held constant at a control temperature that is desired for the target. The target can then be thermally adjusted until the sensor output signal 102 is zero. When the signal 102 is zero, it is known that temperature of the target matches the control temperature $T_s$ at which the sensor 101 is held.

In practice, it may be difficult to completely zero the net heat flux at the thermopile sensor due to noise, for example. However, the net heat flux can be minimized by controlling temperatures until the thermopile output signal is as close to zero as possible. Thus, in minimizing the net heat flux, it is the absolute value of the heat flux that is important.

Minimizing the net heat flux can make a device such as the device in FIG. 1 more accurate in measuring a temperature, even where the net flux is not low enough to completely eliminate the effect of target emissivity. If the target emissivity can be estimated, a calculation of the target temperature can still be made according to Equation 1.11, which is presented hereinafter in the discussion of FIG. 7. In Equation 1.11, any error in estimated target emissivity c has little effect on calculated target temperature if $Q_{NET}$ is very small. Thus, even if the sensor temperature and target temperature are not matched (i.e., the net heat flux is non-zero), the target temperature can still be measured with a high degree of accuracy. The net heat flux may be non-zero, for example, because it is non-static due to the sensor temperature not being completely settled. Even in such a case, the net heat flux can be minimized to the extent possible, and a temperature analyzer, such as a computer, can be configured to calculate the temperature of the target. The calculated temperature can be based upon a control temperature such as the sensor temperature, the output of the radiation sensor, and on an estimated emissivity of the target.

Because of the increased sensitivity and accuracy that minimizing the temperature difference provides, the web target 103 can be accurately measured or controlled in temperature even when the target temperature is lower than 100° C. Temperatures between 100 and 200 can also be determined where thermopile sensors can sustain such temperatures.

In the process control context, the target temperature may be changed by using, for example, manufacturing controls (not shown) that are adjusted based on the sensor output signal 102. This process control method of operating the device 100 is also emissivity independent because, as explained above, the sensor signal 102 is zero when the temperature difference between the sensor and background surface is zero, regardless of emissivity of the target surface 103. The emissivity-independent nature of this measurement is explained further by FIG. 2.

Figure 2:
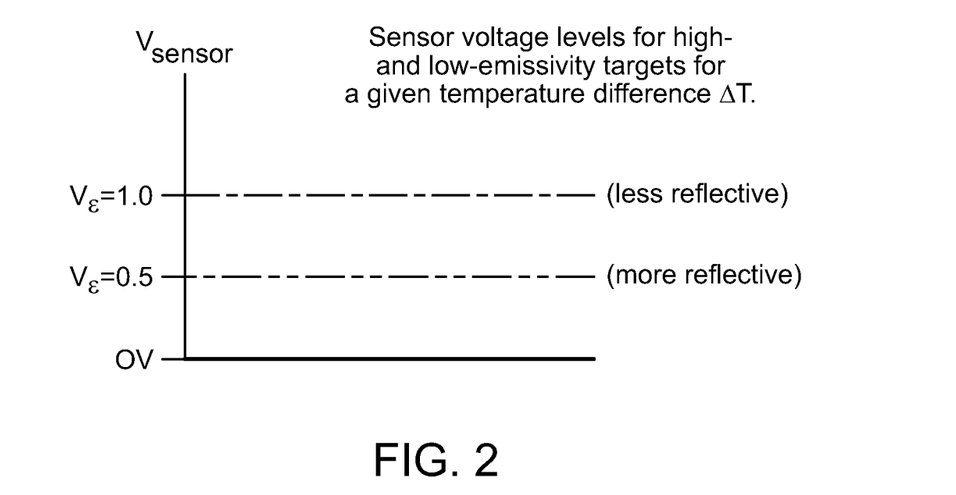
FIG. 2 is a voltage diagram illustrating sensor voltages for surfaces of two different emissivities at a given temperature difference $\Delta T$.

FIG. 2 shows example thermopile sensor voltage levels for target surfaces of two different emissivities at a given temperature difference $\Delta T$ between the target and sensor. If the surface has an emissivity of $\varepsilon=1.0$, then the sensor output voltage is a value $V_{\varepsilon=1}$. However, at the same temperature difference $\Delta T$, if the target surface has an emissivity of $\varepsilon=0.5$, for example, then the thermopile sensor output voltage $V_{\varepsilon=0.5}$ would be half of the value $V_{\varepsilon=1}$. When the temperature difference $\Delta T$ between the thermopile sensor and the target goes to 0, then the net heat flux between the sensor and target goes to zero, regardless of emissivity, and the effect of different emissivities between the target and background surfaces is eliminated.

Since FIG. 2 shows sensor voltage levels for a thermopile sensor, the thermopile sensor voltage output is proportional to the emissivity of the target surface. However, for other types of sensors, the output signal can be non-zero when the net heat flux is zero, and the output signal can be nonlinear with respect to the net heat flux. Thus, for radiation sensors other than thermopile sensors, minimizing the net heat flux between the target and background surfaces may not involve minimizing an output signal of the sensor. Instead, the minimum net heat flux can be derived from an output signal of the sensor in some way other than minimizing the absolute value of an output signal.

While the $\varepsilon=0.5$ emissivity is used in FIG. 2 for convenience of illustration, emissivities for some targets can be much lower. Devices according to embodiments of this invention are preferably configured to measure temperatures of targets with emissivities as low as about 0.1, and even more preferably, as low as about 0.01.

Throughout the present disclosure, "sensor" is used to refer to the active area of an IR detector where IR radiation is detected. For example, a thermopile is an example of a sensor. "Detector" is used to refer to the sensor in combination with a sensor housing or other surfaces adjacent to the sensor. The sensor temperature is preferably equalized with the target temperature in accordance with embodiment methods. Moreover, in most cases, some radiation from a sensor housing may be reflected by a target surface back toward the sensor, which can limit measurement accuracy if the housing is not at the same temperature as the sensor. Thus, it is desirable to maintain a sensor housing at the same temperature as the sensor to increase measurement accuracy. For this reason, the disclosure can refer to "detectors" and their temperatures.

Figure 3:
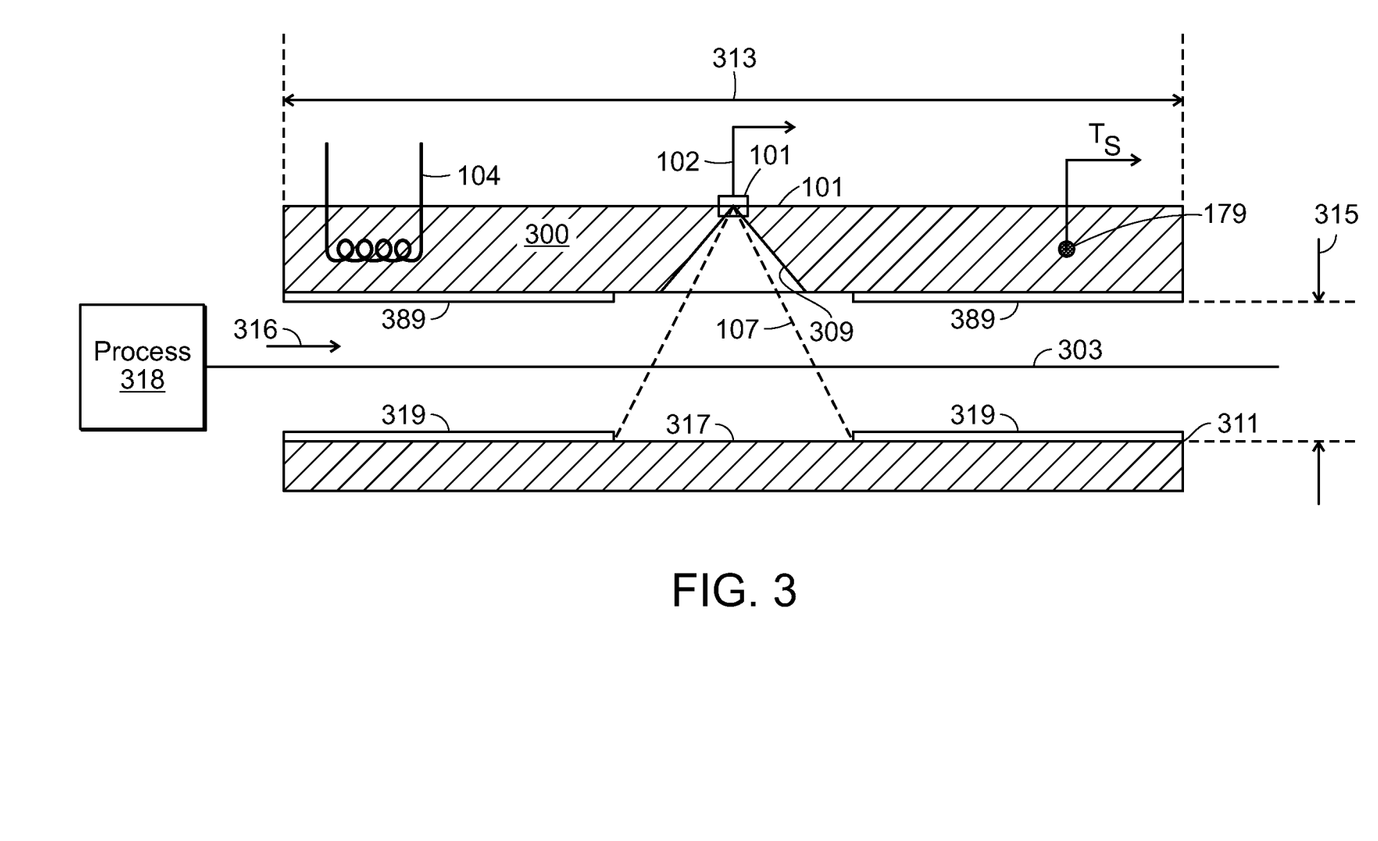
FIG. 3 is an illustration of an infrared sensor viewing a partially transparent target, with an opaque background surface.

FIG. 3 illustrates a device configuration that can be used to accurately measure temperatures of even partially transparent or partially reflective targets. FIG. 3 shows a detector 300 for monitoring the temperature of the target, where the target is a partially transparent target 303 with a closed background surface 311 filling the sensor's field of view 107 in the background of the target 303. The radiation sensor 101 with the field of view 107 is configured to detect radiation from the target 303 and from the background surface 311.

The radiation sensor 101 is a thermopile sensor, which has an output signal of zero when the net flux is zero, and whose output signal is proportional to the net flux. Thus, for sensor 101, it is known that the net flux is zero when the output signal of the sensor is zero. For other sensor types in other embodiments, the values of net heat flux, including minimum net heat flux, are derived from the radiation sensor signal in other ways.

The device of FIG. 3 includes the thermal source 104 to control the temperature of the sensor 101. As mentioned previously in conjunction with FIG. 1, the thermal source 104 can be a heater, for example, when only heating is required for thermal control of the sensor 101. However, in applications in which both heating and cooling are required for thermal control, the thermal source 104 can be a thermoelectric cooler, for example.

The detector device of FIG. 3 is configured to monitor a temperature of a thin-film partially transparent target 303. The sensor 101 receives radiation from both the thin-film target 303 and the background surface 311, around or through the thin-film target 303. Some radiation from the target 303 and the background surface 311 will also arise from reflections of radiation from the detector 300. Radiation emitted from the background surface and transmitted through the partially transparent film does not impact the ability to monitor the temperature of the film, even if the emissivity of the background is unknown. This is because the temperature of the background surface 311 can be held at the same temperature as the sensor 101, and when the thermopile sensor output signal is zero, indicating that the net heat flux is zero, it is known that the sensor 101, background surface 311, and target film 303 share a common temperature. This technique increases the sensitivity of the device such that much lower temperatures can be accurately measured or monitored. For example, temperatures may be lower than 200° C. or even lower than 100° C., depending on the temperature limits of the thermopile sensor.

For reasons similar to those described above for partially transparent targets, embodiments such as that shown in FIG. 3 can be employed with sufficient sensitivity to monitor temperatures of partially reflective targets as well. In one test case, for example, the temperature of a target with an emissivity of 0.04, reflectivity of 0.09, and transmissivity of 0.87 was effectively measured.

The detector device of FIG. 3 can be used in at least two different ways to measure, monitor, or adjust temperatures. A first way to use the device is to insert the thin-film target 303 between the sensor 101 and the background surface 311 and then adjust the shared temperature of the sensor and background surface together until the detector output 102 is zero. When the output is zero, it is then known that the target is at the same temperature as the sensor and background. Further, if the sensor temperature is then measured or otherwise known, then the target temperature is likewise known. This mode of operation can be referred to as temperature measurement mode.

Moreover, as described previously in conjunction with FIG. 1, even if the difference between the temperature of the target and the shared temperature of the sensor and background surface is non-static or otherwise non-zero, the difference can be minimized and the target temperature can be accurately calculated based on the shared temperature of the sensor 101 and background 311, the output of the radiation sensor, and on an assumed emissivity of the target.

A second way to use the device of FIG. 3 is to control a process involving the target. FIG. 3 shows a process 318 for manufacturing the thin-film target material, parameters of the process being controllable to control the temperature of the thin-film. A web of the target material can be moved in a direction 316 through the field of view 107 of the sensor 101. The sensor and background surface can be set and held at a desired target control temperature. The target can then be thermally adjusted until the sensor output signal is as close to zero as possible, at which point it is known that the thin-film target is as close to the same temperature as the sensor 101 as possible. This mode of operation can be referred to as process control mode.

Furthermore, as described previously in conjunction with FIG. 1, even if the net heat flux is non-static due to the target temperature still being stabilized, for example, the temperature of the target can be accurately set or known based upon the control temperature (which is the same as the sensor temperature $T_s$ reported by the thermistor 179 when the sensor temperature $T_s$ is stabilized to the control temperature), the detector output signal 102, and an estimated emissivity of the target. This is because the effect of any uncertainty in the emissivity becomes very small when the net heat flux is minimized, even if the net heat flux is non-static and/or non-zero.

Moreover, the device of FIG. 3 can be used to measure target temperature or control a process for the target even where the temperature difference between the target 303 and the sensor 101 is not minimized. This is possible by minimizing a difference between a calculated target temperature and a temperature shared between a foreground surface surrounding the sensor and the background surface 311. The foreground surface surrounding the sensor can be a detector housing or the target-facing portions 389 of the surface of the detector device 300, for example. While net heat flux in this case will not be zero, the target temperature can still be calculated using Equation 1.11, which is presented hereinafter in the discussion of FIG. 7. In temperature measurement mode, the shared temperature can be thermally adjusted to minimize any difference between the shared temperature and the calculated target temperature, thereby increasing the accuracy of subsequent target temperature measurements. In process control mode, the shared temperature is a shared control temperature, and the target is thermally controlled by process controls, for example, to minimize any difference between the shared control temperature and the calculated target temperature. This method is particularly useful where target temperatures are higher than those which a sensor can withstand.

It should be noted that either of the above two methods of use can optionally include a preliminary calibration step prior to inserting the target. Calibration can involve, for example, equalizing the sensor and background temperatures, followed by zeroing the output signal of the detector electronically or via a software offset. Such a calibration step can be helpful, for example, in cases where a detector output signal is non-zero due to detector electronics rather than a temperature difference between the sensor and the background surface.

The thin-film target 303 does not need to fill the field of view 107 to measure the target temperature. While the sensor signal will generally vary with the percentage of the field filled by the target for a given temperature difference, here the device 300 operates by equalizing the temperatures, at which point the detector signal is zero, regardless of the percentage of the field that is filled. Target objects that may not fill a sensor field of view, and to which the device may be applied, include moving threads, wires, ribbons, perforated metal sheets, and jets of liquid, for example, in addition to films.

One reason for the sensitivity of the device of FIG. 3 to target objects that do not fill the field of view or that have low temperatures is that the background surface 311 is closed. Namely, behind the partially transparent target 303, the sensor 101 only sees the background surface 311, which is maintained at the same temperature as the sensors. There are no holes in the background surface 311 within the field of view 107 for target objects, for example. Thus, with the background surface 311 configured to be opposing the sensor 101, and with the target 303 inserted between them, better sensitivity is possible.

The device 300 of FIG. 3 can be used to monitor temperature of targets with low emissivity as well. When the target has low emissivity, any non-zero detector signal arising from a temperature difference between the target and detector will be small. This is one reason why it is useful to increase the signal-to-noise ratio of the device 300 as much as possible to increase the measurement accuracy. In particular, it may be desirable to have a signal-to-noise ratio at least 6:1, or the radiation sensor 101 to detect at least 6 times more radiation from the background surface 311 and target 303 than from external sources. Even more preferably, the signal-to-noise ratio is at least 10:1. Increasing this ratio can be done in multiple ways.

First, the noise level at the detector can be decreased. Noise can arise from radiation sources other than the background surface and target, such as radiation leaking into the device from the opening between the detector and background and being reflected back and forth between the detector and background until it enters the active sensor area. To decrease this noise, portions 319 on the periphery of the background surface 311 and the opposing portions 389 of the device may be made to have low reflectivity in an IR spectrum. Any radiation leaking in is likely to be absorbed at the low-reflectivity surface when first incident on the surface, and there are multiple opportunities for absorption at this surface as the noise radiation is reflected between the background and detector surfaces.

A second way to improve the signal-to-noise ratio is to increase the radiation seen by the sensor that is emitted by the target. In the device of FIG. 1, this is done by configuring a portion 317 of the background surface to be highly reflective. The high reflectivity portion 317 is adjacent to the low reflectivity portions 319 of the background surface. Similarly, the area of the detector immediately surrounding the sensor may be reflective. The highly reflective portion 317 is in the central region of the background surface, where radiation from the surface is most likely to be seen by the detector. This highly reflective region 317 is likely to reflect radiation emitted from the target back to the detector, thus contributing to the net radiation flux and increasing the signal when the target is not at the detector/background temperature.

The number of reflections before external radiation reaches the sensor, and thus probability of absorption, can be increased by providing a gap between the detector and background surfaces that is small in comparison with the length or width of the surfaces. In FIG. 3, for example, the detector 300 has a surface length 313, and there is a gap 315 between the detector 300 and the partially transparent target 303 that is significantly smaller than the length 313. These dimensions are chosen to decrease the amount of radiation leaking into the device from the sides and to increase the proportion of radiation incident at the detector that arises from the temperature-controlled surfaces and the target. The gap-to-length ratio should preferably be lower than 1:6. Even more preferably, the gap-to-length ratio should be lower than 1:10. In one embodiment, for example, a length of 2.5 inches and gap of 0.25 inches are a suitable combination to increase the signal-to-noise ratio.

The radiation detector 300 also includes a highly reflective cup 309 adjacent to the active sensor area. The operation of high-reflectivity cups such as the cup 309 to increase signal radiation at the sensor has been previously described in, for example, U.S. Pat. No. 4,636,091.

Figure 4:
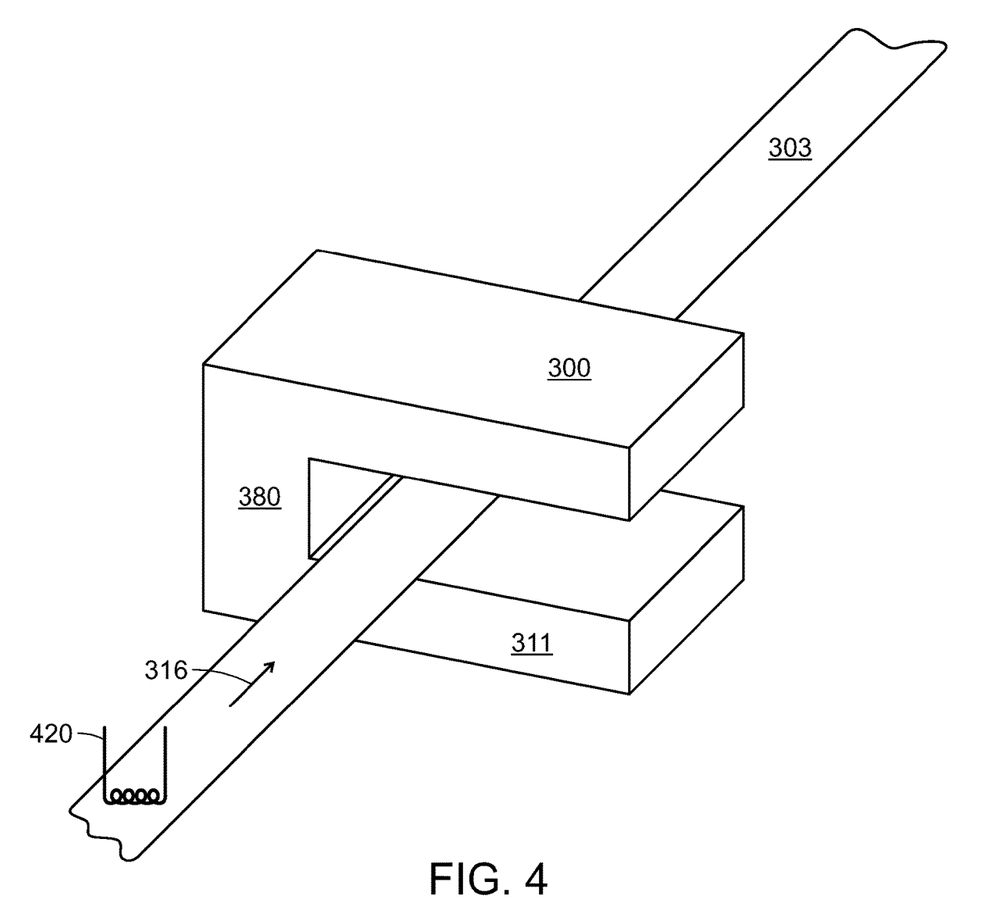
FIG. 4 is a perspective drawing of the sensor, target, and background surface shown in FIG. 3.

FIG. 4 is a perspective drawing of the detector 300, partially transparent target 303, and closed background surface 311 from FIG. 3. FIG. 4 shows that the detector 300 and the closed background surface 311 are in thermal contact through a connecting bracket 380 and are on opposite sides of the target 303. The purpose of the thermal contact is to maintain temperatures of the detector and background surfaces as close as possible so that they essentially share the same temperature. The bracket 380 is constructed of one or more highly conductive materials such as aluminum, for example, to minimize any temperature gradients.

The temperature throughout different parts of the detector assembly in the steady state condition can be substantially the same, especially if a high-conductivity material is used for the bracket and detector and background surfaces and if these surfaces are well insulated from external sources of heat or cold. Whether the sensor and background surface are in thermal contact, as in FIG. 4, or are simply independently temperature controlled to a shared temperature, they should be maintained at substantially the same temperature. Preferably, the temperature difference is no greater than about 0.1° C., and even more preferably, the difference is less than about 0.01° C.

FIG. 4 also shows a web of the thin-film target 303 advancing in the direction 316 through the temperature monitoring device. A thermal source 420 applied to the web is also shown. Thermal source 420 can be any source that affects the temperature of the target 303, such as heat from air surrounding the web or heat from a manufacturing process in which the target 303 is made or modified. In the process control context, the thermal source 420 can be actively adjusted to control the temperature of the web by using manufacturing process controls, for example. The thermal source 420 can be adjusted in response to the sensor output signal (not shown).

Figure 5:
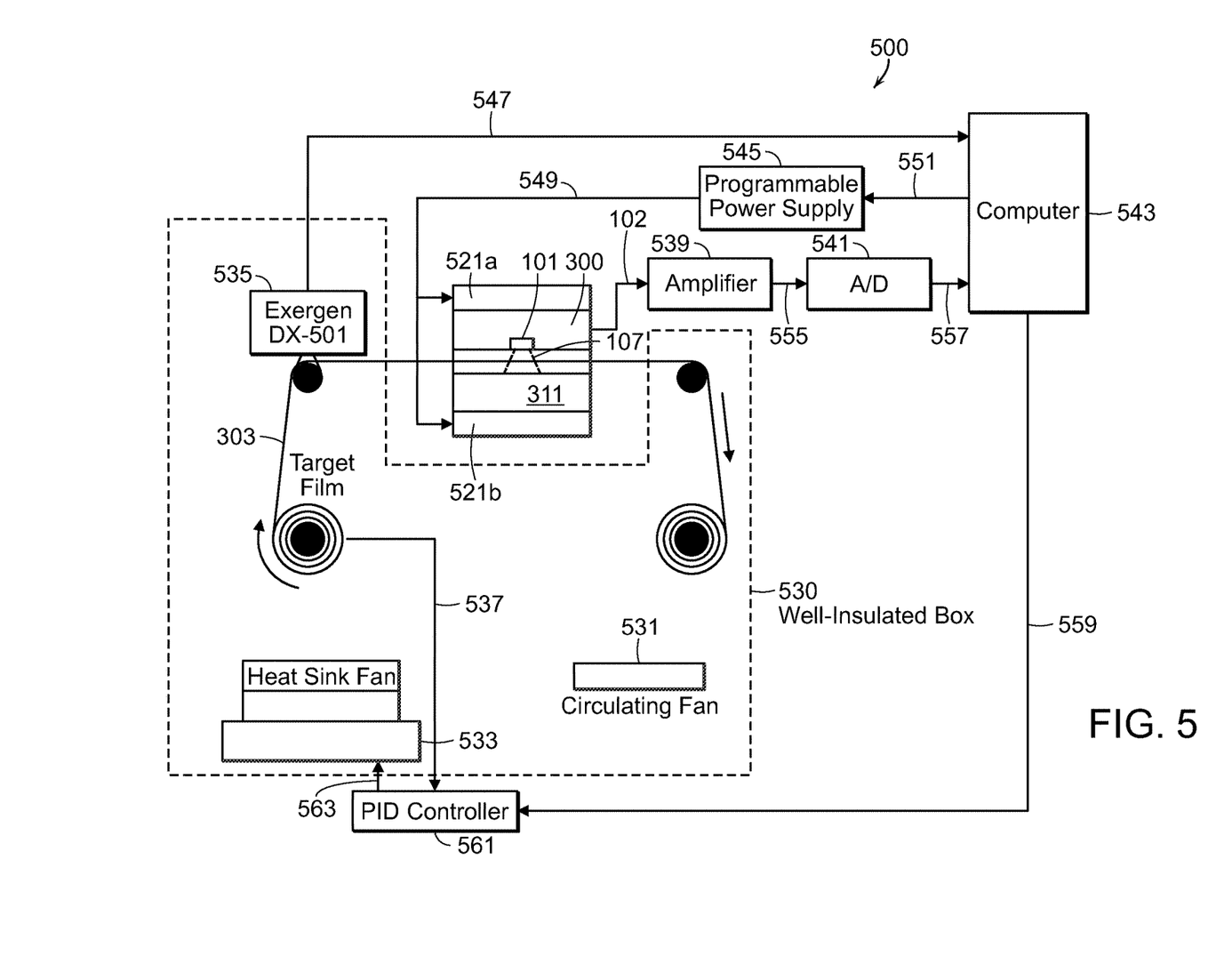
FIG. 5 illustrates a detector apparatus configured to monitor temperature of a thin-film target.

FIG. 5 illustrates a device 500 for testing process control for the thin-film target 303. At the core of the device 500 is the IR sensor 101 with the field of view 107 configured to view the target film 303 and the background surface 311. The sensor 101 and background surface 311 include thermal controllers 521a and 521b for heating and cooling and for setting the IR sensor 101 and the background surface 311 at a control temperature. The output voltage 102 from the IR sensor 101 is routed to an amplifier 539 to amplify the signal. The output 555 of the amplifier 539 is routed into an analog-to-digital (A/D) converter 541, and the output 557 of the converter 541 is routed to a computer 543. The computer 543 sends command signals 551 to a programmable power supply 545, which sends control signals 549 to thermal controllers 521a-b to maintain the sensor 101 and the background surface 311 at the control temperature.

The device 500 also includes some elements designed to test the device performance. Rolls of the target film 303 are held within an insulated structure 530 to maintain control and uniformity of the temperature of the film 303. The insulated structure 530 includes a thermal controller 533 and a circulating fan 531 to maintain a uniform temperature in the structure 530. The heat sink and fan included with the thermal controller 533 provide tighter thermal control and fewer gradients within the structure 530. A temperature sensor 535 monitors the temperature of the target film 303 by measuring the temperature of the roller on which the film 303 is held. The sensor 535 is used as a reference to measure the temperature of the film just before it exits the temperature controlled chamber. The sensor 535 cannot accurately measure the target film 303 itself, but the film 303 quickly stabilizes to the temperature of the roller on which it is held, and the temperature of the roller can be accurately measured. The film 303, the roller, and the temperature sensor 535 are isothermal once the temperature in the enclosure 530 stabilizes.

An output signal 547 from the sensor 535 is sent to the computer 543. The computer 543 sends control signals 559 to a PID controller 561, which controls the thermal controller 533 via an output signal 563 using an input temperature signal 537. Thus, via the thermal controller 533, the PID controller 561 can heat or cool to change the temperature of the structure 530 and the target film 303 to maintain the temperature of the structure 530 to be uniform for test purposes. In another embodiment, for example, the film 303 is not held within an insulated box nor separately monitored by the temperature sensor 535. In yet another embodiment, the enclosure 530 is a film manufacturing environment, and the IR sensor 101 monitors the temperature of the film 303 for manufacturing process control purposes.

The background surface 311 can be designed to have the surface of the plate controlled to a uniform temperature by heating or cooling the bottom of the plate, for example, by the thermal controller 521b. Applying a uniform heat flux to the bottom of the surface plate will change the temperature of the surface accordingly. The thermal controllers 521a-b can include a series of resistors for heating purposes. While heating provided by a series of such discreet heaters may not be perfectly uniform, the resistors or other heating elements can be spread out and placed in a manner to provide acceptably uniform heating to the background surface 311. The thermal controllers 521a-b can also include thermoelectric coolers, for example, to provide both heating and cooling where required.

Figure 6:
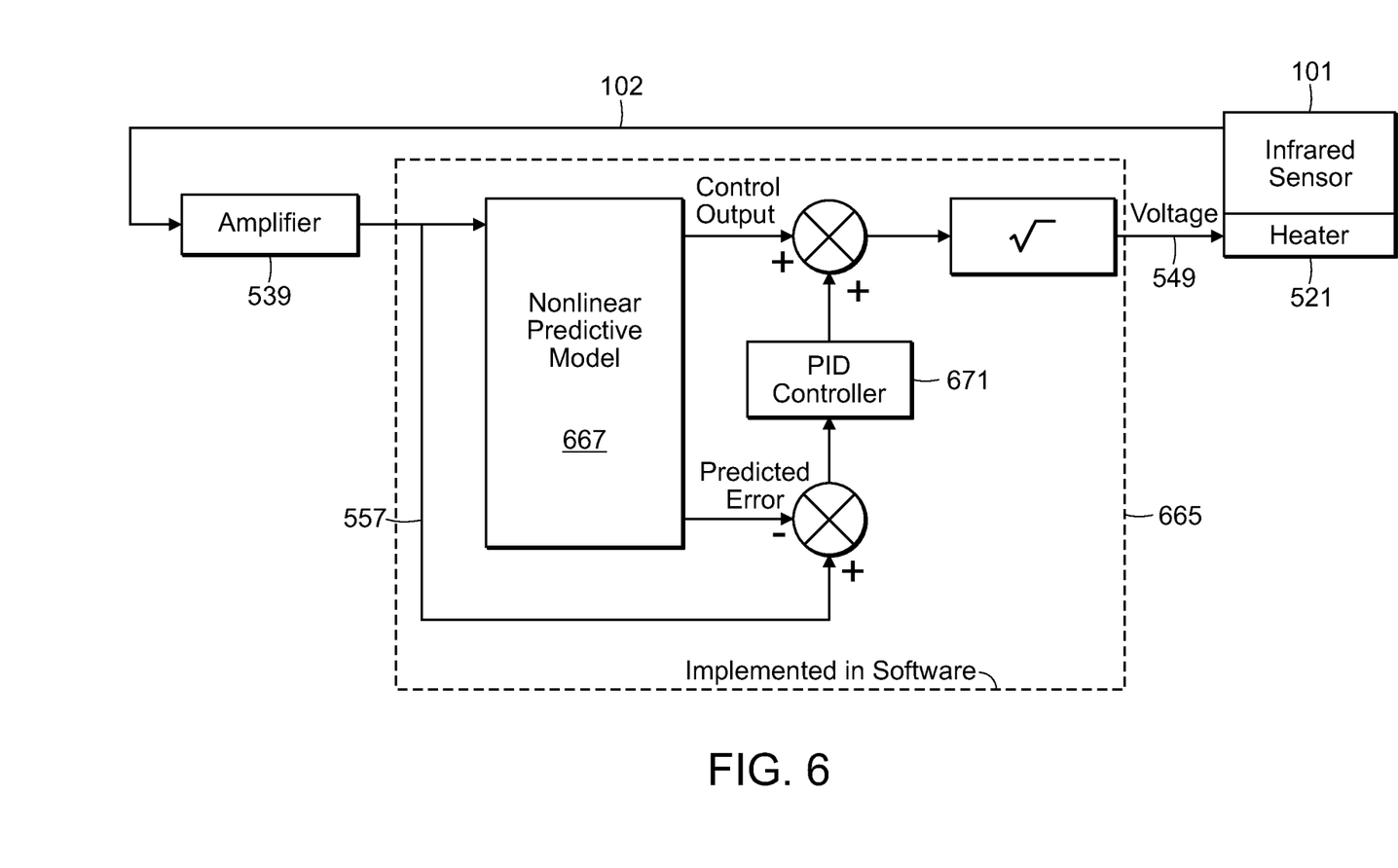
FIG. 6 illustrates a control loop used for maintaining a null heat flux between a sensor and a target.

FIG. 6 illustrates a control loop used for maintaining a minimized or zero net heat flux detected at the sensor 101. Minimizing the net heat flux can require careful temperature control to minimize any temperature difference between the sensor and target, especially for thin films and other low-emissivity targets. The device of FIG. 5 operates in temperature measurement mode rather than process control mode, so the temperature of the sensor is changed to closely match the temperature of the target. The control loop in FIG. 6 performs the temperature control. In FIG. 6, the IR sensor 101 provides the output signal 102 to the amplifier 539. Implemented in software in the computer 543 (shown in FIG. 5) is a temperature controller 665. The temperature controller 765 includes a nonlinear predictive model 667 and a PID controller 671. The nonlinear model 667 improves the performance of the control loop by incorporating a measured output response of the sensor when subjected to an approximate impulse heating disturbance in the sensor 101. This output response information is used to generate a piecewise linear function that is used as a model of the output of the detector, given the heating history. The correct temperature of the sensor 101 with respect to the target 303 can be ensured through the action of the temperature controller 665 acting to minimize the value of the thermopile's voltage output 102.

High-accuracy measurements can also require controlling the temperature of the sensor and also the temperature of the background surface to high precision to maintain a shared temperature. In cases where any thermal contact between the sensor and background surface is not sufficient to maintain the temperatures the same, an additional temperature control loop, for example, can provide the necessary temperature equalization. Moreover, maintaining a uniform temperature between the background and foreground can also be important.

It should be noted that temperature transients within the detector caused by the heating of the sensor itself can also be important to minimize. There can be a design tradeoff between response time and bandwidth in this regard. In particular, if the thermal correction response is very fast and is driven hard enough to cause substantial temperature gradients in the detector and background plates, then temperature can vary rapidly, but may result in transient errors, especially if the thermal correction is driven hard enough to cause substantial temperature gradients inside the thermopile. The maximum heating and cooling rates can be artificially limited to prevent unacceptable errors while the device is actively changing in temperature.

Thermopile Sensors and Related Equations

Thermopiles have several advantages over some of the other options for IR radiation sensors. Thermopiles are cheap and widely available from a number of vendors. They are fairly sensitive to incoming radiation and are linear over many orders of magnitude of signal. Like all thermal sensors, thermopiles can react to low-energy photons and can work well for targets at relatively cool temperatures. They also require no bias voltage or current, which simplifies things a bit, and eliminates one source of errors and noise in a completed system. The voltage output of a thermopile for a given heat flow is not particularly sensitive to changes in temperature of the thermopile itself. Thermopiles also have identically zero signal when the target and thermopile are at the same temperature, which is one property that can be exploited to make temperature measurements of surfaces with very low emissivities.

At the heart of a thermopile sensor is the thermocouple. When two dissimilar metals are connected, a voltage is generated that is dependent upon the temperature of the junction. To use this "Seebeck Effect" to measure temperature of the dissimilar metal junction, a separate reference measurement of temperature is needed. When working with thermocouples, this is referred to as the cold junction, and traditionally an ice bath was used to establish a reference temperature of 0° Celsius. While the use of a physical ice bath is still not unknown, it is now much more common to use an electrical temperature sensor (thermistor, resistance temperature detector (RTD), or a band-gap temperature sensor) to measure the reference temperature at the cold junction and then use that reference measurement, along with the voltage developed by the thermocouple, to compute the temperature of the hot junction.

"Thermopile" is actually a generic term to describe a collection of thermocouples connected in series so that the voltages generated by each thermocouple junction are added. In the present disclosure, "thermopile" can refer to a type of thermal infrared detector with an active area that absorbs (and emits) infrared radiation efficiently, and a series of thermocouple junctions that develop a voltage based on a temperature difference between the absorbing area and a reference location in the sensor. There is much variation in the geometry and materials used in commercially available thermopile sensors. A thermopile requires a reference temperature measurement of its "cold junction" in order to obtain a temperature measurement for a target.

For simplicity, the present disclosure assumes that all objects are diffuse emitters. A diffuse emitter is a surface that emits and absorbs radiation from all directions equally well. Diffuse emitters are sometimes termed hemispherical emitters. The results presented herein do not depend on the diffuse emitter assumption, but directionality is ignored as a matter of convenience. Note that geometrical view factors are also ignored as a matter of convenience, since the sensor's field of view is typically fixed for this application and the sensor's output signal is a product of the geometrical view factor and the sensitivity of the sensor. Since the output sensitivity of the thermopile is usually individually calibrated for each device as a practical matter, the gain adjustment can be made to account for both the sensitivity of the thermopile and the geometry of the sensor.

A blackbody is a theoretical object that emits thermal radiation at the maximum possible rate at all wavelengths and absorbs all radiation falling upon it. A blackbody functions as the standard to which the emission and absorption of real surfaces are referenced. (A blackbody can be well approximated for experimental purposes by a small opening into a large interior cavity in a solid body.) The energy radiated per area by a blackbody at a given temperature and wavelength is given by the Planck Distribution:

$$E(\lambda, T) = \frac{2\pi h c^2 \lambda^{-5}}{e^{(hc/k\lambda T)} - 1} \tag{1.1}$$

where h is the Planck Constant ($6.6262 \times 10^{-34}$ J s), c is the speed of light ($2.9979246 \times 10^8$ m/s), $\lambda$ is the wavelength of the radiation, k is the Boltzmann Constant ($1.380662 \times 10^{23}$ J/K), and T is the temperature of the surface in Kelvin.

Emissivity, $\varepsilon$, is a property of a physical surface, and it refers to the efficiency of emitting and absorbing infrared radiation, as a fraction of the radiation that would be emitted or absorbed by an equivalent blackbody. Therefore, the values of emissivity for real surfaces vary between 0 and 1. Emissivity can vary as a function of wavelength, temperature, and even with time as the condition of a surface changes.

The total amount of energy emitted by a real object (non-blackbody) can be found by integrating the product of the emissivity of the object and the energy emitted by a blackbody, Equation 1-1 over all wavelengths:

$$Q = \int_0^\infty \varepsilon(\lambda) E(\lambda) d\lambda \tag{1.2}$$

An assumption often made is that emissivity is independent of wavelength (and everything else); the surface is then referred to as being a "greybody." In the case of a greybody, the emissivity is a constant between zero and one, and evaluating the above integral gives:

$$Q = \varepsilon \sigma T^4 \tag{1.3}$$

where $\sigma$ is the Stefan-Boltzmann constant.

FIG. 7 is a schematic diagram 700 illustrating sources of thermal radiation absorbed and emitted by an infrared sensor 701 using greybody assumptions. The IR sensor 701 emits energy 705a. A partially transparent target 703a transmits energy 705b, which can be absorbed by the sensor 701. The target 703a emits energy 705c. When infrared energy 705e is incident on the target surface 703a, energy 705d is reflected, and energy 705f is transmitted through the target surface 703a.

As illustrated in FIG. 7, the net heat flow at the sensor is a combination of energy that is reflected, transmitted, and emitted by the target surface, minus the energy that is emitted by the sensor itself. This net heat flow actually measured by the thermopile is termed $Q_{NET}$ in Equation 1.4:

$$Q_{NET} = -Q_{SENSOR} + Q_{TRANSMITTED} + Q_{EMITTED} + Q_{REFLECTED} \quad (1.4)$$

Any given radiation that falls on a surface is either absorbed, reflected, or transmitted through the object. If absorption is always equal to emissivity, then:

$$\varepsilon + \tau + r = 1 \quad (1.5)$$

where $\tau$ is the transmissivity, and $r$ is the reflectivity of the target.

Unlike the direct measurement of IR radiation given by photon counting devices, the output voltage of a thermopile is a measure of the net heat flow delivered to the absorber area of the thermopile sensor by absorption and emission of infrared radiation by the absorber.

In order to use the output signal of a thermopile to compute the temperature of the target object being measured, an independent reference measurement of the temperature of the thermopile is needed. This reference temperature is required to compute the value of the heat flux emitted by the absorber area of the thermopile, $Q_{SENSOR}$ in Equation 1.4.

In the case where the target is a greybody, and given the disclosed narrow gap geometry, all sources of reflections from or transmission through the target are the detector and background surfaces, which are at the same temperature as the sensor; the background, foreground, and sensor behave as blackbodies; and the sensitivity of the thermopile is invariant with respect to wavelength. Under this greybody condition, and starting from Equations 1.4 and 1.3, the temperature of the target can be computed as:

$$Q_{NET} = -\sigma T^4 + \tau \sigma T^4 + \varepsilon \sigma T^4 + r \sigma T^4$$

$$Q_{NET} = -(1 - \tau < r)\sigma T^4 + \varepsilon \sigma T^4$$

Taking note of Equation 1.5, this can be simplified to:

$$Q_{NET} = \varepsilon \sigma T^4 - \varepsilon \sigma T^4 \quad (1.6)$$

Equation 1.6 can also be written as $$Q_{NET} = \varepsilon \sigma (T_t^4 - T_s^4),$$

where $T_t$ is $T_{TARGET}$ and $T_s$ is $T_{SENSOR}$.

Rearranging Equation 1.6 to solve for the temperature of the target gives:

$$T_{TARGET} = \sqrt[4]{\frac{Q_{NET}}{\varepsilon * \sigma} + T_{SENSOR}^4} \quad (1.7)$$

In the real world, it is rare for all of those assumptions to be true. Since sensors built for measuring the IR radiation from cool targets normally have a filter window installed whose transmission of IR varies with wavelength, the integration of Equation 1.2 requires an additional term in the integrand for the variable transmission with wavelength, and becomes:

$$Q = \int_0^\infty \tau_{Filter}(\lambda)\varepsilon(\lambda\backslash)E(\lambda\backslash)d\lambda \quad (1.8)$$

If the surface to be measured is assumed to be grey, then the constant emissivity in Equation 1.8 can be pulled out of the integrand, and the equation simplifies to:

$$Q = \varepsilon \int_0^\infty \tau_{Filter}(\lambda)E(\lambda\backslash)d\lambda \quad (1.9)$$

Several assumptions can then be made. First, the emissivity of the target can be assumed or measured. Second, the emissivity of the sensor's active area can be assumed to be one. Third, it can be assumed that the ambient background temperature is uniform and identical to the temperature of the sensor. With this set of assumptions, Equation 1.4, Equation 1.5, and Equation 1.9 can be combined and give:

$$\int_0^\infty \tau_{Filter}(\lambda)E(\lambda\backslash)d\lambda = \frac{Q_{NET}}{\varepsilon} + \int_0^\infty \tau_{Filter}(\lambda)E(\lambda\backslash)d\lambda \quad (1.10)$$

The integrations of Equation 1.10 can be done numerically, and the results can be used to generate a function f, wherein the target temperature is given as a function of the other variables involved:

$$T_{TARGET} = f\left(\frac{Q_{NET}}{\varepsilon} + \int_0^\infty \tau_{Filter}(\lambda)E(\lambda\backslash)d\lambda\right) \quad (1.11)$$

Since all of the terms on the right side of Equation 1.11 are easily measurable, this form is convenient to use in computing the target temperature when building an infrared sensor. If the target temperature is not otherwise measured and is to be computed, Equation 1.11 can be used to calculate the target temperature.

As explained above in conjunction with FIG. 1, the relationship $Q_{NET} = \varepsilon \sigma (T_t^4 - T_s^4)$, which is a rewritten form of Equation 1.6, shows that when $Q_{NET}$ is zero, the target and sensor temperatures are equal, and thus the target temperature can be known by measuring the sensor temperature, independent of the value of target emissivity. However, as can be seen in Equation 1.11, even where $Q_{NET}$ is non-zero, the effect of any error in assumed emissivity will be proportionally reduced by minimizing the absolute value of $Q_{NET}$. Thus, while it is preferable to zero the difference between the target and sensor temperatures, accurate values may still be obtained by minimizing any difference between them.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A device for process control, the device comprising:
   a radiation sensor having its temperature set to a control temperature;
   a web target be viewed by the radiation sensor as the web target passes the radiation sensor; and
   process control that to be thermally controls temperature of the web target to minimize net heat flux at the radiation sensor set to the control temperature.

2. The device of claim 1, wherein the control temperature is less than about 200° C.

3. The device of claim 1, wherein the web target is a thin film target.

4. The device of claim 1, wherein the web target is partially transparent.

5. The device of claim 1, wherein the target has an emissivity that is low, unknown, or variable.

6. The device of claim 1, further comprising a background surface filling a field of view of the radiation sensor in a background behind the target, and wherein at least a portion of the background surface within the field of view has high reflectivity in an infrared spectrum.

7. The device of claim 1, further comprising a background surface filling a field of view of the radiation sensor in a background behind the target, and wherein the radiation sensor is further configured to detect at least 10 times more radiation from the background surface than from external sources.

8. The device of claim 1, wherein the radiation sensor is further configured to detect radiation from a background surface and from the web target, wherein the target is configured to be introduced between the background surface and the radiation sensor, the device further comprising a thermal controller configured to minimize the net heat flux at the radiation sensor by minimizing a difference between the temperature of the web target and a shared temperature of the radiation sensor and the background surface.

9. The device of claim 1, wherein the radiation sensor is a thermopile radiation sensor, and wherein the web target is configured to be thermally controlled by minimizing an output signal of the radiation sensor.

10. The device of claim 1, wherein the net heat flux is non-static, the device further comprising a temperature analyzer configured to calculate a temperature of the web target based upon the control temperature, an output of the radiation sensor, and an estimated emissivity of the web target.

11. A method of process control, the method comprising:
    setting temperature of a radiation sensor at a control temperature; and
    controlling a temperature of a web target viewed by the radiation sensor as the web target passes the radiation sensor to minimize net heat flux at the radiation sensor.

12. The method of claim 11, wherein the temperature to which the web target is controlled is less than about 200° C.

13. The method of claim 11, wherein controlling the temperature of the web target comprises controlling the temperature of a thin film target.

14. The method of claim 11 wherein controlling the temperature of the web target comprises controlling the temperature of a partially transparent target.

15. The method of claim 11, wherein the web target has an emissivity that is low, unknown, or variable.

16. The method of claim 11, wherein setting a radiation sensor at a control temperature comprises setting a thermopile radiation sensor at the control temperature, and wherein controlling the temperature of the web target comprises minimizing an output signal of the radiation sensor.

17. The method of claim 11, the web target being situated between the radiation sensor and a background surface, the background surface and the radiation sensor being maintained at substantially the same temperature.

18. A device for process control, the device comprising:
    a radiation sensor;
    a foreground surface surrounding the radiation sensor and a closed background surface filling a field of view of the radiation sensor, the foreground and background surfaces having their temperature set to a shared control temperature;
    a web target viewed by the radiation sensor as the web target passes the radiation sensor, the radiation sensor detecting temperature of the passing web target; and
    process control that thermally controls temperature of the web target to minimize difference between the shared control temperature and the detected temperature of the web target.

19. The device of claim 18, a temperature of the radiation sensor differing from the shared control temperature.

20. A method of process control comprising:
    setting temperature of a foreground surface surrounding a radiation sensor and a closed background surface filling a field of view of the radiation sensor to a shared control temperature;
    passing a web target past the radiation sensor as it is viewed by the radiation sensor;
    detecting temperature of the passing web target with the radiation sensor; and
    thermally controlling temperature of the web target to minimize difference between the shared control temperature and the detected temperature of the web target.

21. The method of claim 20 wherein a temperature of the radiation sensor differs from the shared control temperature.

* * * * *

UNITED STATES PATENT AND TRADEMARK OFFICE
CERTIFICATE OF CORRECTION

PATENT NO. : 11,821,794 B2
APPLICATION NO. : 17/176705
DATED : November 21, 2023
INVENTOR(S) : Jason N. Jarboe and Francesco Pompei It is certified that error appears in the above-identified patent and that said Letters Patent is hereby corrected as shown below:

In the Claims

In Column 17, Claim 1, Line 7, please insert --thermopile-- before "radiation";

In Column 17, Claim 1, Line 9, please delete "be" before "viewed";

In Column 17, Claim 1, Line 11, please delete "to be" before "thermally controls";

In Column 17, Claim 11, Line 53, please insert --thermopile-- before "radiation";

In Column 18, Claim 18, Line 25, please insert --thermopile-- before "radiation";

In Column 18, Claim 20, Line 42, please insert --thermopile-- before "radiation".

Signed and Sealed this
Ninth Day of January, 2024

Katherine Kelly Vidal
*Director of the United States Patent and Trademark Office*